US006175690B1

United States Patent
Chung et al.

(10) Patent No.: US 6,175,690 B1
(45) Date of Patent: Jan. 16, 2001

(54) FLASH CAMERA WITH EXTENDABLE ARM FOR DISABLING THE FLASH UNIT

(75) Inventors: Franco Yik Kai Chung, N.T.; Arthur Zawodny, Tsing Yi Island, both of (HK)

(73) Assignee: Concord Camera Corp., Hollywood, FL (US)

( * ) Notice: Under 35 U.S.C. 154(b), the term of this patent shall be extended for 0 days.

(21) Appl. No.: 09/437,379

(22) Filed: Nov. 10, 1999

(51) Int. Cl.[7] .................... G03B 17/02; G03B 15/03; G03B 7/26

(52) U.S. Cl. .............. 396/6; 396/205; 396/543; 396/176

(58) Field of Search ............ 396/6, 155, 176, 396/177, 178, 205, 206, 348, 448, 543

(56) References Cited

U.S. PATENT DOCUMENTS

| 1,564,207 | 12/1925 | Cloud .................. 200/61.8 |
| 1,770,241 | 7/1930 | Patrick ................. 200/518 |
| 1,840,849 | 1/1932 | Rollman ................ 200/518 |
| 1,901,385 | 3/1933 | Warner et al. .......... 200/518 |
| 3,296,949 | 1/1967 | Bounds .................. 95/11 |
| 3,943,313 | 3/1976 | Carboni ................ 200/61.62 |
| 3,990,166 | 11/1976 | Nagelkirk ............... 40/77 |
| 4,085,414 | 4/1978 | Burgarella et al. ...... 354/145 |
| 4,112,447 | 9/1978 | Iwata ................... 354/145 |
| 4,166,680 | 9/1979 | Maitani ................. 354/126 |
| 4,189,222 | 2/1980 | Maitani ................. 354/126 |
| 4,231,645 | 11/1980 | Davis et al. ............ 354/145 |
| 4,239,361 * | 12/1980 | Harvey ................. 396/206 |
| 4,239,363 * | 12/1980 | Sato ................... 396/264 |
| 4,261,658 | 4/1981 | Uchiyama et al. ........ 354/126 |
| 4,295,719 | 10/1981 | Lange .................. 354/50 |
| 4,348,087 | 9/1982 | Ellin et al. ............ 354/139 |
| 4,460,256 | 7/1984 | Araki et al. ........... 354/173.11 |
| 4,502,768 * | 3/1985 | Tsuji et al. ........... 396/176 |
| 4,511,233 | 4/1985 | Kazami et al. .......... 354/418 |
| 4,522,479 | 6/1985 | Yamada et al. .......... 354/413 |
| 4,525,046 | 6/1985 | Takaoka et al. ......... 354/149.11 |
| 4,592,635 | 6/1986 | Vaughn ................. 354/133 |
| 4,595,268 | 6/1986 | Tsuboi ................. 354/149.11 |
| 5,598,237 | 1/1997 | McIntyre et al. ........ 396/264 |
| 5,602,458 | 2/1997 | Dowe ................... 320/5 |
| 5,860,033 | 1/1999 | Stanchus et al. ........ 396/176 |
| 5,862,414 | 1/1999 | Zawodny et al. ......... 396/6 |

* cited by examiner

*Primary Examiner*—Eddie C. Lee
(74) *Attorney, Agent, or Firm*—Woodcock Washburn Kurtz Mackiewicz & Norris LLP

(57) ABSTRACT

A flash camera has an extendable arm mechanically coupled to a flash on/off switch. The arm extends from the camera body when the switch is on the "on" position, and automatically retracts and returns the switch to the "off" position if the extended arm is bumped or touched. The arm also serves to provide a visual indication that the flash switch is in the "on" position.

20 Claims, 3 Drawing Sheets

FLASH CAMERA WITH EXTENDABLE ARM FOR DISABLING THE FLASH UNIT

BACKGROUND OF THE INVENTION

Cameras with integral flash units ("flash cameras") are well known in the art. A typical flash camera includes an electronic flash unit that comprises a flash charging circuit, a flash tube and a battery for powering the flash charging circuit. Single use flash cameras are also known in the art. A single use camera is one that has been pre-loaded with film and sold to the consumer with the intent of being used only a single time (i.e., with only the roll of pre-loaded film) by the end user. See, for example, commonly assigned U.S. Pat. No. 5,862,414 ("the '414 patent"), the entirety of which is incorporated herein by reference. A single use flash camera manufactured by the assignee hereof under the designation "SL-60" has an integral flash unit and a slidable flash on-off switch. In many flash cameras, such as the SL-60, and other cameras of like type, the flash charging circuit continues to operate as long as the on-off switch is in the "on" position. If, after taking a flash exposure, the user forgets to place the switch in the "off" position, the battery may be unnecessarily drained. The user may be unaware that the flash was not turned off because the physical position of the slide switch i.e., in the "on" position, may not be obvious to the user. A light source such as a neon bulb or LED may be provided to indicate that the flash unit is on, but a light source may escape the user's attention and further drain the power source. Some cameras have an automatic flash circuit cutoff, but this additional circuitry adds to the expense of the camera.

It is therefore desirable to provide a means that both provides an obvious, physical indication to the user that the flash unit is on, and automatically moves the switch to the "off" position when the indication is bumped or the camera is placed on a surface, such as a table top, and which is simple and inexpensive to implement. The present invention achieves these goals.

SUMMARY OF THE INVENTION

According to the invention, a flash camera, such as, but not limited to, a single use flash camera, has a flash on-off switch that is mechanically coupled to an arm via an actuator. When the on-off switch is moved from the "off" position to the "on" position, the arm is moved by the actuator to an extended position, out of and away from the camera body, against the bias provided by a spring. In this position, the arm is obvious to a user and also creates a projection that will likely be touched or bumped if the user attempts to place the camera, while in this condition, in a pocket of clothing, in a purse, or the like. The actuator cooperates with the spring and the arm to cause the arm to automatically retract into the camera body in response to a minor amount of force being applied to the extended arm, such as a force resulting from bumping the arm against one's clothing or another object. Due to the coupling of the arm and actuator to the on-off switch, this retraction causes the switch to move to the "off" position, thus disabling the flash charging circuit. The arm can be situated so that, when extended, it protrudes from the bottom of the camera and will come into contact with a surface, such as a table top, on which the camera might be placed in an upright condition. In addition, when the switch is moved to the "off" position, the flash charging circuit is disabled and the arm retracts from the extended position to the retracted position.

DETAILED DESCRIPTION OF THE DRAWINGS

DETAILED DESCRIPTION OF DISCLOSED EMBODIMENT

Figure 1:
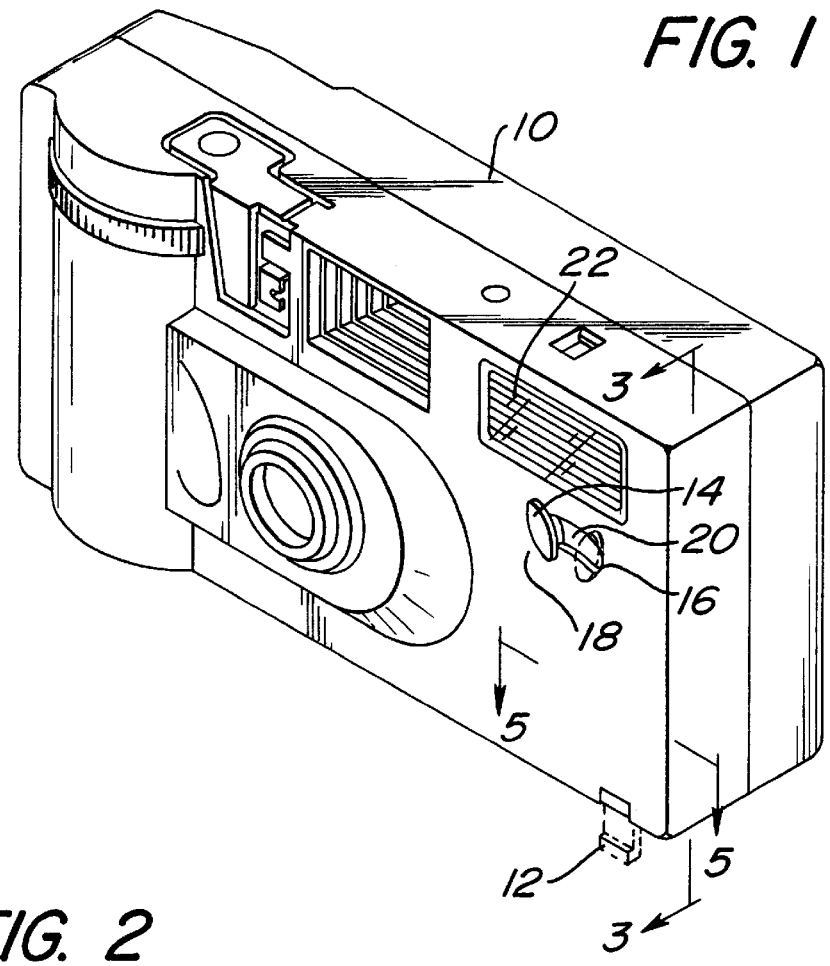
FIG. 1 is a perspective view of one embodiment of a camera, such as a single use camera, having an extendable arm in accordance with the present invention.

Referring to the drawings, wherein like numerals represent like elements, there is shown in FIG. 1 a flash camera 10 equipped with an extendable arm 12. Camera 10 may be any flash camera, such as a single use flash camera, having an electronic flash device including a flash tube 22 mounted within the camera body. For example, camera 10 may be the aforementioned SL-60 camera modified in accordance with the present teachings. Camera 10 has a manually operable flash switch button 14 slidable between an "on" position 16 and an "off" position 18 for enabling and disabling a flash charging circuit (not shown). Switch button 14 is shown as being movable in an arcuate sliding region 20 of the front face of the camera 10, but such movement can also be linear or transverse to the face of the camera body (as in a push button switch), etc. In accordance with the invention, the arm 12 protrudes or extends from the body of camera 10 when the switch button 14 is in the "on" position 16 and is retracted when the switch button is in the "off" position 18. The arm 12 also serves to move the switch button 14 to the "off" position 18 when a minor force (such as touching or bumping) is applied to the arm 12 when it is extended. In the disclosed embodiment, the arm 12 travels transversely to the bottom surface of the camera 10, as shown in FIG. 1.

Figure 2:
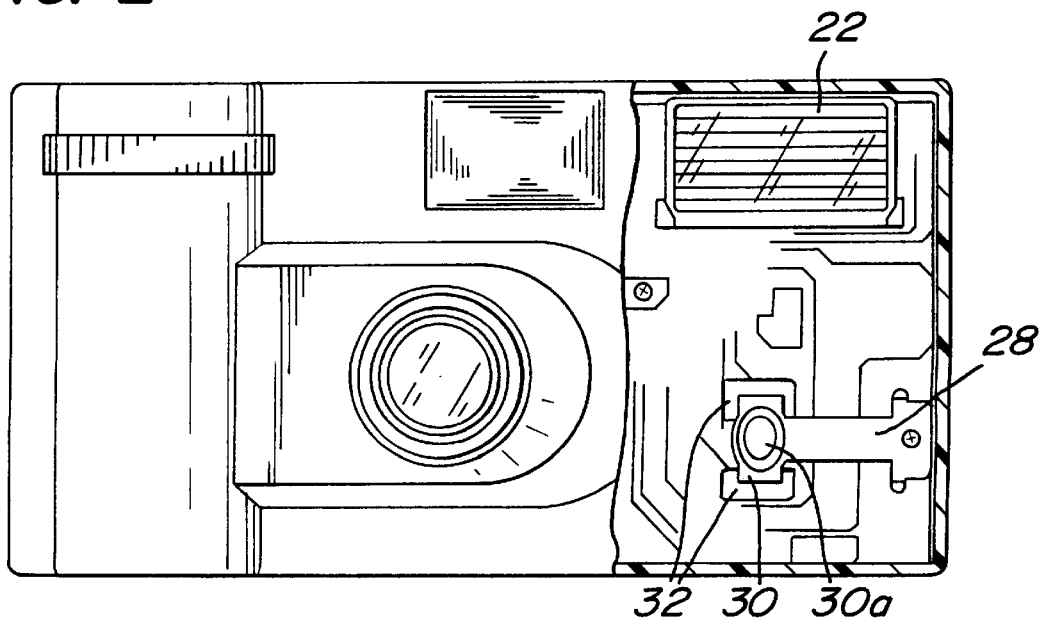
FIG. 2 is a front plan view of the camera of FIG. 1, with the right side thereof being partially cut away to show details of a flash switch.
Figure 3:
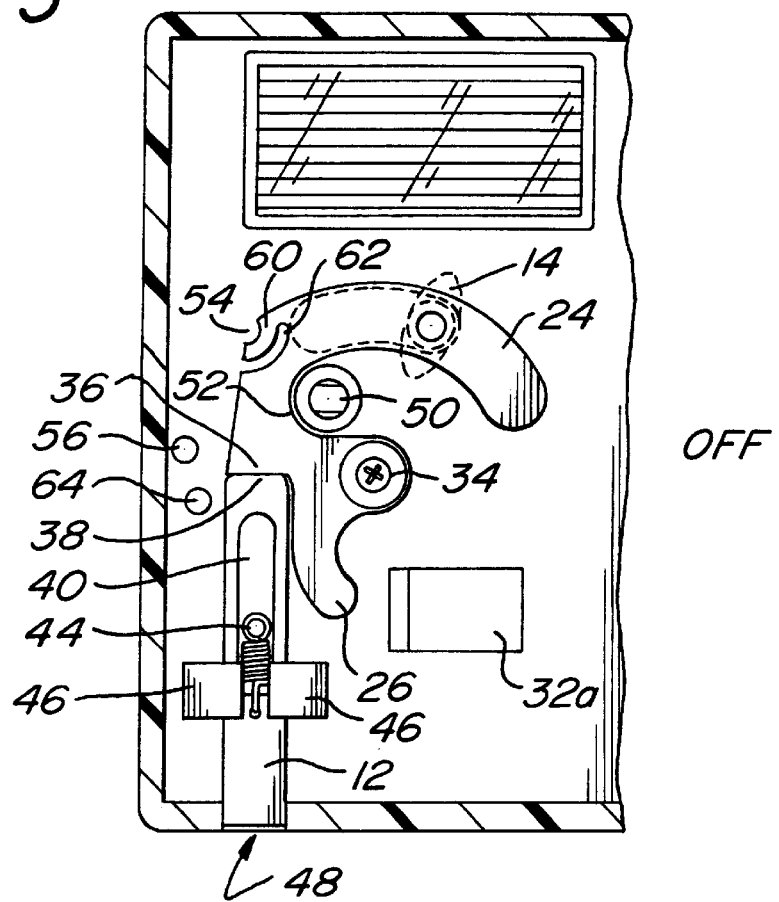
FIG. 3 is a cross section taken through line 3—3 of FIG. 1 and illustrates the flash switch in the "off" position and the arm in a retracted position.
Figure 4:
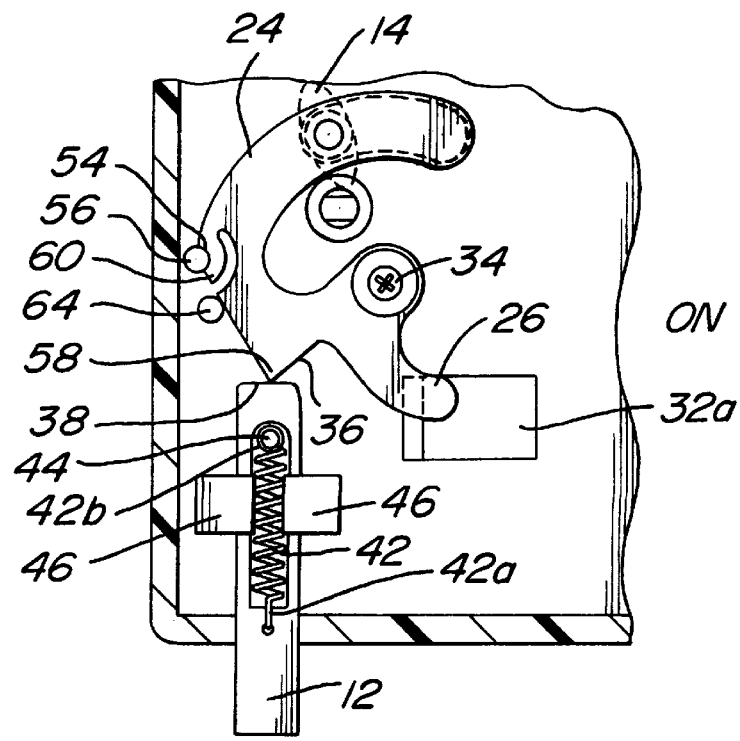
FIG. 4 is a cross section taken through line 3—3 of FIG. 1 and illustrates the flash switch in the "on" position and the arm in the extended position.
Figure 5:
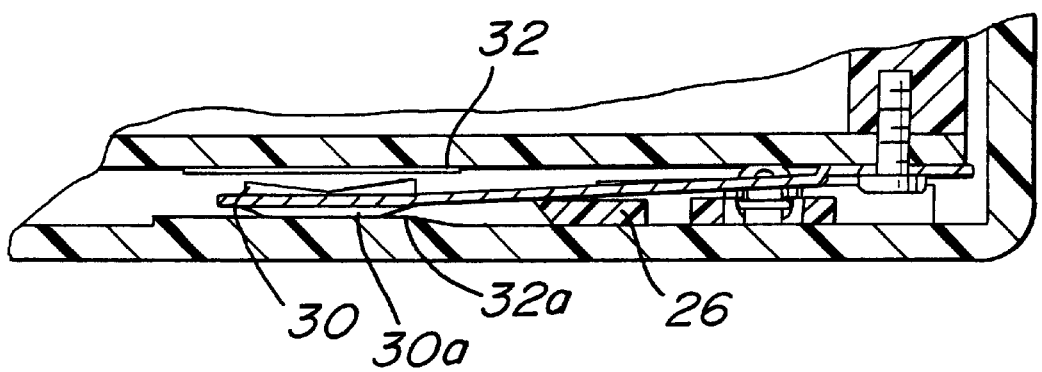
FIG. 5 is a cross section taken through line 5—5 of FIG. 1 and illustrates the flash charging member in the "off" position.

As shown in FIGS. 3 and 4, switch button 14 is attached to an actuator 24 having a terminal portion 26. It will be appreciated that sliding movement of switch button 14 will cause terminal portion 26 to move in an arcuate path. As shown in FIG. 2, a cantilevered flash charging connection member 28 has an electrically conductive free end 30. As shown in FIG. 5, a raised portion 30a of end 30 is normally biased towards a portion of the camera body defining a raised pad 32a (i.e., in a direction away from a viewer of FIGS. 3 and 4), such that end 30 normally projects into the path of travel of terminal portion 26. As shown in FIGS. 3 and 5, when the switch button 14 is in the "off" position 16, the terminal portion 26 is clear of end 30 such that terminal portion 26 does not depress free end 30 against contacts 32. In this condition, free end 30 does not complete the electrical connection through contacts 32. In this state, the power source (battery) is disconnected from the flash charging circuitry and the flash charging circuitry is disabled.

Figure 6:
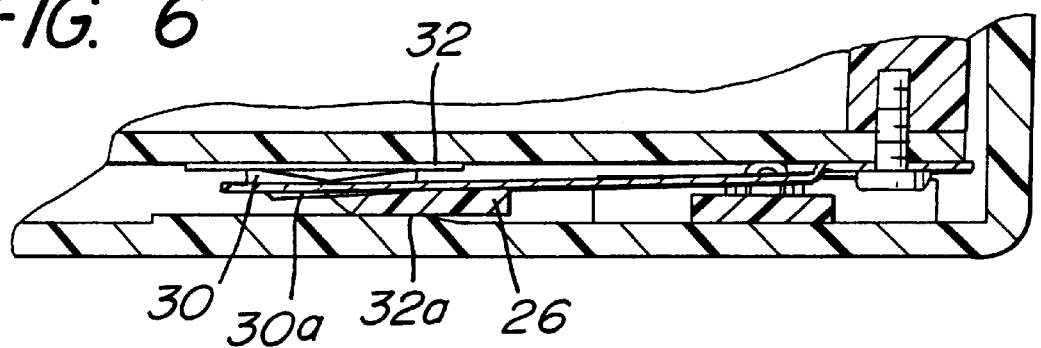
FIG. 6 is a cross section taken through line 5—5 of FIG. 1 and illustrates the flash charging member in the "on" position.

As shown in FIGS. 4 and 6, when the switch button 14 is in the "on" position 18, the terminal portion 26 is wedged between raised portion 30a of end 30 and raised pad 32a, such that terminal portion 26 contacts raised portion 30a of end 30 and urges end 30 against contacts 32, thereby completing the electrical connection between end 30 and contacts 32. In a preferred embodiment, raised portion 30a of end 30a is of semi-rigid material, such as thin sheet metal, such that raised portion 30a can be depressed in the direction of contact pads 32 by the urging of terminal portion 26. In this state, the power source is connected to the flash charging circuitry and the flash charging circuitry is enabled.

Arm 12 has a cavity 40 that contains a tension spring 42. One end 42a of spring 42 is coupled to a proximal end of arm 12; the other end 42b of spring 42 is attached to a rigid post that is fixed to the camera body. Thus spring 42 urges the arm 12 into the camera body, i.e., to the condition shown in FIG. 3. A pair of arms 46 define guide members for guiding the arm 12 into and out of the camera body via aperture 48.

The actuator 24 may be considered to be in the nature of a cam that is rotatable about a pivot point 34 defined by e.g., a screw or post. A post 50 is positioned to contact a portion 52 of the actuator 40 when the switch button 14 has been moved to the "off" position so as to define a stopper that prevents further rotation of the actuator 24, and also further sliding motion of switch button 14. A surface 36 of the actuator 24 cooperates with a distal portion 38 of arm 12. When the actuator 24 is in the position shown in FIG. 3 (corresponding to the flash switch button "off" position), surface 36 permits arm 12 to travel in and out of the aperture 48, but the arm 12 is urged inside the camera body (retracted) by action of the spring 42. However, as the flash switch button 14 is moved from the "off" position 16 to the "on" position 18 (FIG. 4), actuator 24 rotates counterclockwise against the force exerted by spring 42. Surface 36 becomes cocked as shown and eventually contacts a stopper or post 64 fixed to the camera body such that further rotation is prevented. The cocking action urges a corner 58 of the actuator 24 against arm 12 and urges arm 12 out of aperture 48 (against the force exerted by spring 42) and into the extended position shown in FIG. 4.

The actuator 24 has a portion 60 defined by an absence of material in a region 62. Actuator 24 is preferably constructed of a thermoplastic material such that, although the actuator is rigid, the portion 60 is flexible and springlike and thus defines a leaf spring. An arcuate surface 54 is provided and has a contour that substantially matches the contour of a post 56 fixed to the camera body. As actuator 24 is moved counterclockwise from the "off" position (FIG. 3) to the "on" position (FIG. 4), the surface 54 will contact the post 56. With continued movement in this direction, post 56 urges the leaf spring 60 inwardly (towards area 62) until the surface 54 snaps firmly into place about post 56. The spring constant of leaf spring 60 is only slightly greater than the spring constant of spring 42, and, in this condition, the force exerted by leaf spring 60 against post 56 is only slightly greater than the force exerted by spring 42 and is sufficient to prevent spring 42 from retracting the arm 12. However, due to the slight difference in forces exerted by the two springs in this condition, only a minor force applied to the extended arm 12, such as a bump or slight touch, or the weight of the camera itself upon the arm 12 (e.g., if the camera is placed on a surface) is sufficient to cause the surface 54 to become displaced relative to post 56 and thus allow the force exerted by spring 42 to dominate. In response to such occurrence, spring 42 urges the distal end 38 of arm 12 against the corner 58, thus causing the actuator to rotate clockwise until the terminal portion 26 no longer contacts end portion 30. At this juncture, the flash charging circuitry is disconnected from the battery as described above.

It will be appreciated that the arm 12, when in the extended position, also provides a visual indication that the flash switch is "on."

There has been described a camera having an extendable arm that causes a flash switch to automatically return from the "on" position to the "off" position when touched or bumped and that also provides a visual indication to the user that flash switch is in the "on" position. It is to be understood that even though numerous characteristics and advantages of the present invention have been set forth in the foregoing description, together with details of the structure and function of the invention, the disclosure is illustrative only, and changes may be made in detail, especially in matters of shape, size and arrangement of the parts within the principles of the invention to the full extent indicated by the broad general meaning of the terms in which the appended claims are expressed.

What is claimed is:

1. A camera comprising:
a body;
an electronic flash mounted within the body;
a flash switch including a flash switch button on the body manually movable between on and off positions;
an arm coupled to the switch and movable into and out of the body with movement of the switch between the off and on positions, such that, when the switch is in the on position the arm extends out of the body, and when the switch is in the off position the arm is substantially retracted inside the body, and movement of the arm between the extended and retracted positions moves the flash switch between the on and off positions, respectively;
a spring biasing the arm to the retracted position;
a retaining mechanism for holding the arm in the extended position, against the bias of the spring;
wherein application of an external force to the arm, when extended, causes the retaining mechanism to release the hold, such that the switch button moves to the off position.

2. The camera according to claim 1, wherein the arm extends from the bottom surface of the camera body.

3. The camera according to claim 1, wherein the arm provides a visual indication that the flash switch is in the on position.

4. The camera according to claim 1, further comprising an actuator coupling the arm and switch.

5. The camera according to claim 4, wherein said actuator defines a rotatable cam, having a surface that cooperates with the arm to both (i) cause the arm to extend and retract in response to movement of the flash switch between on and off positions, respectively and (ii) cause the switch to move to the off position when said force is applied to the arm in the extended position.

6. The camera according to claim 5, said flash switch further having a cantilevered flash charging connection member wherein a terminal portion of the actuator cooperates with a conductive end of said cantilevered member to electrically communicate with a contact when the switch button is moved to the on position.

7. The camera according to claim 5, wherein said spring defines a first spring, and wherein the actuator includes a second spring having a spring constant greater than the spring constant of the first spring, and adapted to offset a force applied by the first spring when the arm is in the extended position.

8. The camera according to claim 7, wherein said retaining mechanism includes said second spring and a post, and wherein said second spring is a leafspring with a semicircular portion that abuts said post when the switch button is in the on position.

9. The camera according to claim 5, further comprising a first stopper, for coming into contact with and stopping the movement of the actuator when the switch button is in the on position, and a second stopper, for coming into contact with and stopping the movement of the actuator when the switch button is in the off position.

10. A camera comprising:

a body;

an electronic flash mounted within the body;

a flash switch including a flash switch button manually movable between on and off positions;

a member, which is extendable from said body, such that, when the switch is in the on position said member extends out of the body, and when the switch is in the off position the member is substantially retracted inside the body;

a spring biasing the switch to the off position and the member to the retracted position;

a retaining mechanism for holding the switch in the on position, and the member in the extended position, against the bias of the spring;

wherein application of force to the member, when extended, causes the retaining mechanism to release the hold, such that the switch moves to the off position.

11. The camera according to claim 10, wherein the member extends from the bottom surface of the camera body.

12. The camera according to claim 10, wherein the member provides a visual indication that the flash switch is in the on position.

13. The camera according to claim 10, further comprising an actuator coupling the member and switch.

14. The camera according to claim 13, wherein said actuator defines a rotatable cam, having a surface that cooperates with the member to both (i) cause the member to extend and retract in response to movement of the flash switch between on and off positions, respectively and (ii) cause the switch to move to the off position when said force is applied to the member in the extended position.

15. The camera according to claim 14, said flash switch further having a cantilevered flash charging connection member wherein a terminal portion of the actuator cooperates with a conductive end of said cantilevered member to electrically communicate with a contact when the switch button is moved to the on position.

16. The camera according to claim 14, wherein said spring defines a first spring, and wherein the actuator includes a second spring having a spring constant greater than the spring constant of the first spring and adapted to offset a force applied by the first spring when the member is in the extended position.

17. The camera according to claim 16, wherein said retaining mechanism includes said second spring and a post, and wherein said second spring is a leafspring with a semicircular portion that abuts said post when the switch button is in the on position.

18. The camera according to claim 14, further comprising a first stopper, for coming into contact with and stopping the movement of the actuator when the switch button is in the on position, and a second stopper, for coming into contact with and stopping the movement of the actuator when the switch button is in the off position.

19. A camera comprising:

a body;

an electronic flash mounted within the body;

a flash switch including a flash switch button on the body manually movable between on and off positions;

an arm coupled to the switch and movable into and out of the body with movement of the switch between the off and on positions, such that, when the switch is in the on position the arm extends out of the body, and when the switch is in the off position the arm is substantially retracted inside the body, and movement of the arm between the extended and retracted positions moves the flash switch between the on and off positions, respectively;

a spring biasing the arm to the retracted position;

a retaining mechanism for holding the arm in the extended position, against the bias of the spring; and an actuator coupling the arm and switch, wherein said actuator defines a rotatable cam, having a surface that cooperates with the arm to both (i) cause the arm to extend and retract in response to movement of the flash switch between on and off positions, respectively and (ii) cause the switch to move to the off position when said force is applied to the arm in the extended position, wherein application of an external force to the arm, when extended, causes the retaining mechanism to release the hold, such that the switch button moves to the off position.

20. The camera according to claim 19, said flash switch further having a cantilevered flash charging connection member wherein a terminal portion of the actuator cooperates with a conductive end of said cantilevered member to electrically communicate with a contact when the switch button is moved to the on position, and wherein said spring defines a first spring, and wherein the actuator includes a second spring having a spring constant greater than the spring constant of the first spring, and adapted to offset a force applied by the first spring when the arm is in the extended position.

* * * * *